(12) United States Patent
Dunn

(10) Patent No.: US 6,315,325 B1
(45) Date of Patent: Nov. 13, 2001

(54) MODULAR CHASSIS TUNING SYSTEM

(75) Inventor: Jerry R. Dunn, Boaz, AL (US)

(73) Assignee: TDY Industries, Inc., Pittsburgh, PA (US)

( * ) Notice: Subject to any disclaimer, the term of this patent is extended or adjusted under 35 U.S.C. 154(b) by 0 days.

(21) Appl. No.: 09/694,664

(22) Filed: Oct. 23, 2000

(51) Int. Cl.$^7$ ................................................ B60R 21/00
(52) U.S. Cl. .................... 280/755; 280/759; 280/781; 280/783; 280/800
(58) Field of Search .................... 280/755, 757, 280/758, 759, 781, 783, 800

(56) References Cited

U.S. PATENT DOCUMENTS

| | | | |
|---|---|---|---|
| 4,322,094 | * | 3/1982 | Bobard . |
| 5,072,801 | * | 12/1991 | Freymann et al. . |
| 5,685,563 | * | 11/1997 | Ottestad . |

* cited by examiner

*Primary Examiner*—Eric Culbreth
(74) *Attorney, Agent, or Firm*—Patrick J. Viccaro

(57) ABSTRACT

An apparatus for tuning the weight distribution in a vehicle, typically a high performance automobile, is provided. The apparatus includes a weight tray having an internal passage, a screw element, typically a threaded bolt, that extends into an end of the internal passage, a retainer at the same end of the passage, defining a hole through which the screw is rotatably retained, a primary weight is disposed within the passage and having a bore into which the screw extends and a nut or a threaded portion (i.e., a tapped portion) disposed within the bore that operatively engages the threads of the screw. Additional weights may be attached to the primary weight to increase the weight in the weight tray. The primary and additional weights may further include interlocking portions that are suitably configured to interlock with a corresponding interlocking portion on another weight. One or more of the weights may be assembled from two weight segments to facilitate assembly of the apparatus with minimal tools. The segments may be of different mass and/or density. A method for distributing weight in a vehicle also is provided that includes the use of the described apparatus.

19 Claims, 5 Drawing Sheets

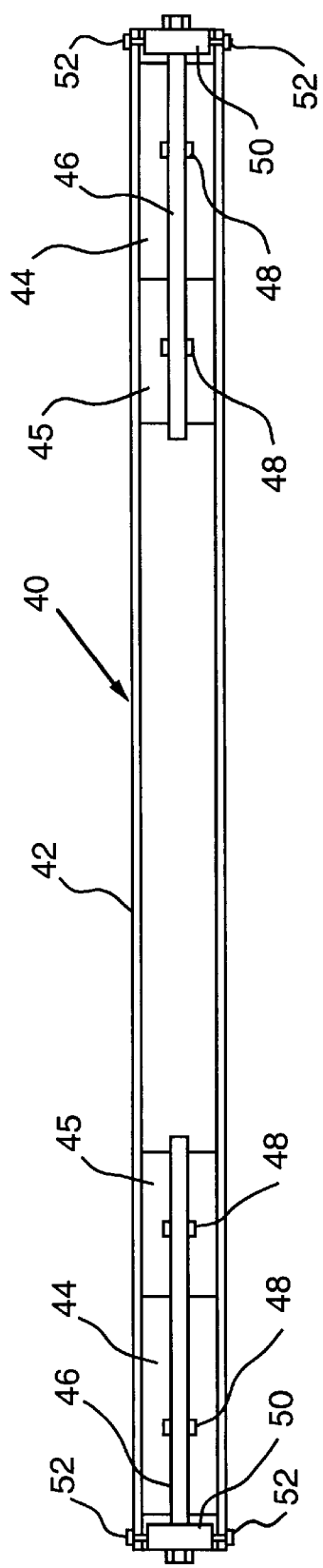
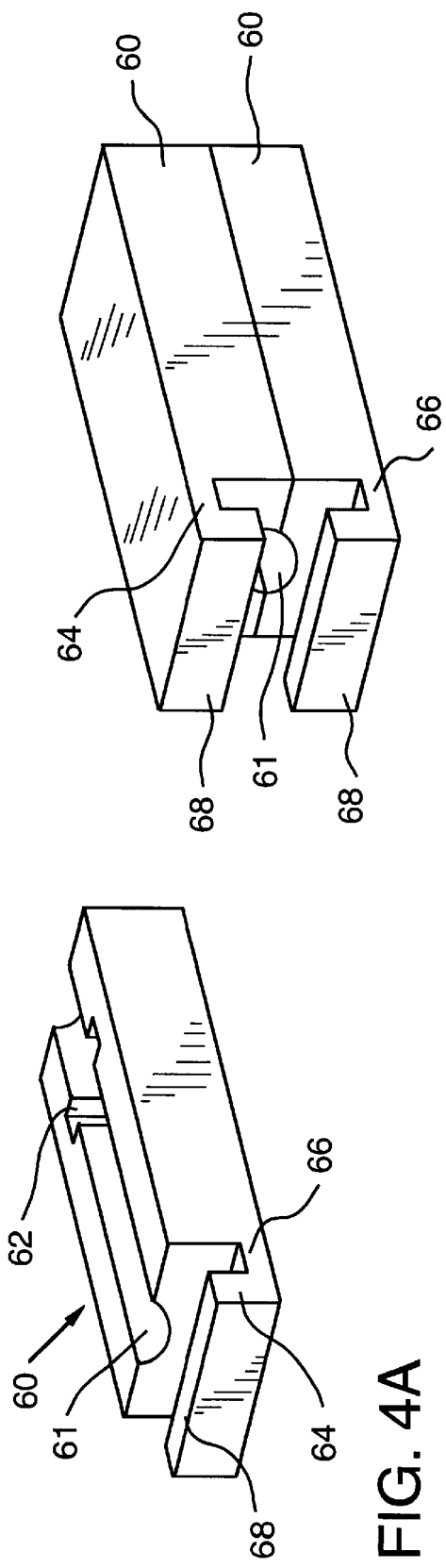
FIG. 3
FIG. 4A
FIG. 4B

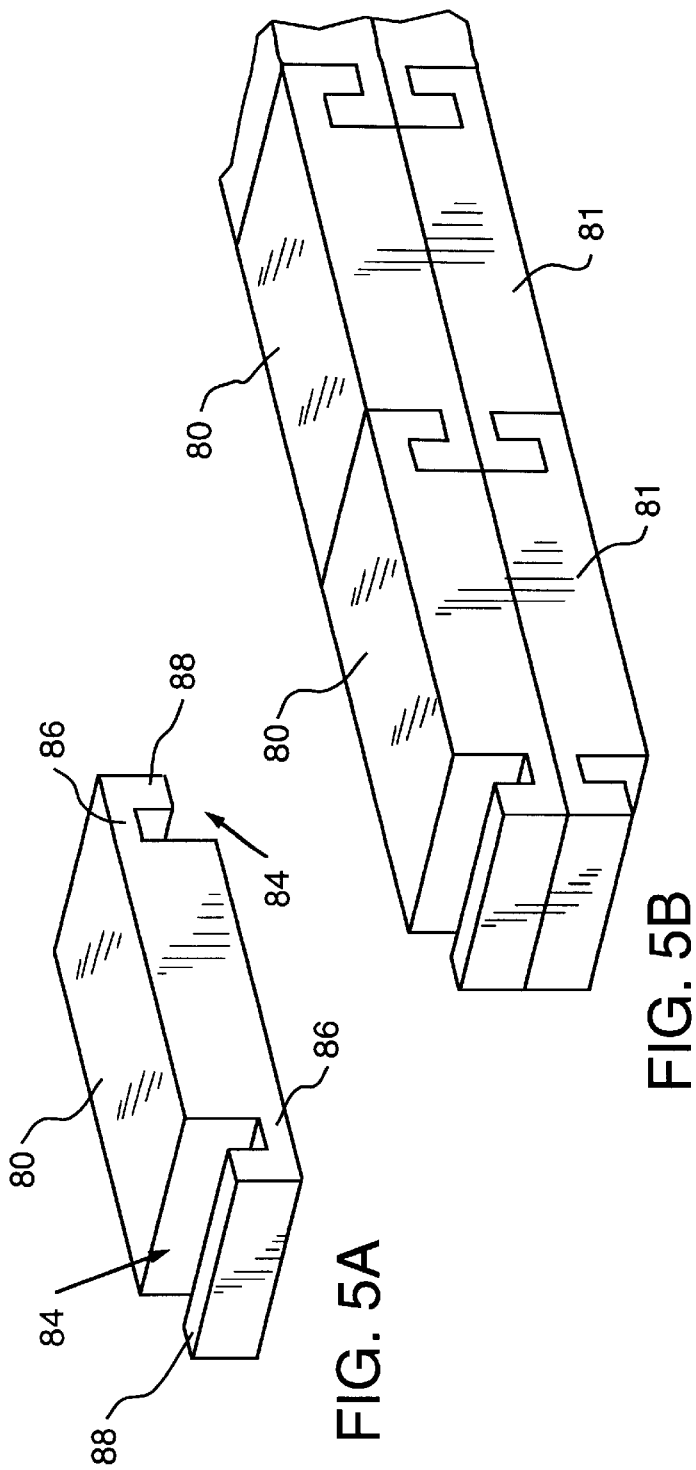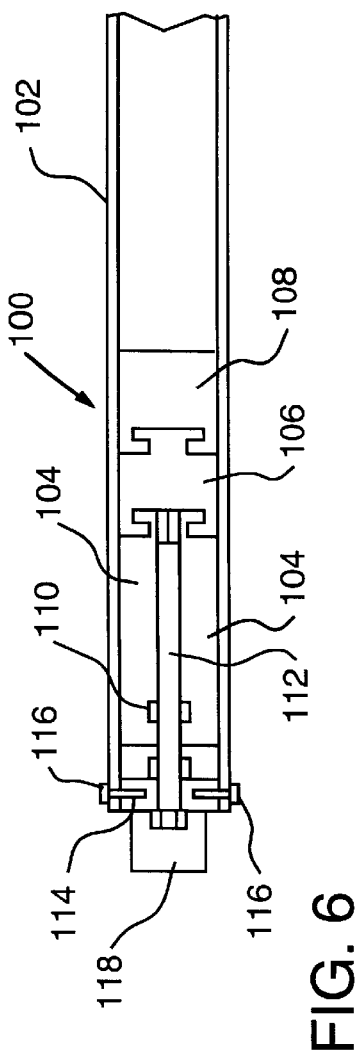

MODULAR CHASSIS TUNING SYSTEM

BACKGROUND

1. Field

A weight distribution system for a vehicle, preferably a high-performance automobile is provided. Also provided is a method for weight tuning a vehicle and a method for retrofitting a vehicle with the described weight distribution system.

2. Description of the Related Art

Proper distribution of weight in a vehicle is critical to the performance of the vehicle. In automobiles, for instance, elaborate suspension systems are used to maintain an appropriate weight distribution to achieve optimal handling characteristics. In high performance vehicles, such as in racing automobiles, the criticality of proper weight distribution is magnified. Small differences in weight distribution will affect vehicle handling and may determine the outcome of the race. The appropriate weight distribution may depend on which track the vehicle is racing and on how the vehicle is equipped. A method of fine-tuning the weight distribution in a racing vehicle is therefore required.

Certain automobile racing authorities, such as NASCAR, set limits on how the weight distribution in a vehicle may be adjusted. Specifically, in many instances, motorized or remote-controlled adjustments are prohibited. At the present time, the weight balance of a vehicle is fine-tuned according to FIG. 1 (prior art). FIG. 1 shows a frame member that forms part of an automobile frame. Typically, two frame members 1 are disposed laterally in a car frame, typically extending from the back of a front tire well to the front of a rear tire well on both the left and right sides of the vehicle. The frame members 1 form weight trays 2 that are circumferentially disposed about weights 3. The weights 3 are held in place within the weight trays by internal spacers 4, external spacers 5 and retainers 6. The spacers 4 and 5 are available in fixed lengths or can be cut to any length to accommodate a variety of sizes of weights 3 and to position the weights 3 within the weight tray 2. Nevertheless, fine-tuning of the weight distribution in the weight tray 2 by this method is very difficult. This is a time-consuming process that often must be performed on race day. Therefore, a weight distribution system is desired that can easily adjusted and, when appropriate, can be automatically adjusted.

SUMMARY

A weight distribution system for fine-tuning the distribution of mass in a vehicle is provided. The system includes a weight tray, typically elongated, having an internal passage. Disposed in at least one end of the passage, and typically in both ends of the passage, are a screw element, typically a threaded bolt, that extends into an end of the internal passage. A retainer is removably attached to the same end of the passage, the retainer defining a hole through which the screw is rotatably retained. A primary weight is slidably disposed within the passage, the primary weight having a bore into which the screw extends. A screw engaging member, typically a nut or a threaded portion (i.e., a tapped portion) of the bore, that operably engages the threads of the screw, is disposed within the bore. The screw engaging member engages at least a portion of the bore to retain the screw engaging member in a substantially fixed position in the weight and to inhibit rotation of the screw engaging member. Additional weights may be attached to the primary weight to increase the weight in the weight tray. The primary weight, and/or all weights used in the system may further include interlocking portions that are suitably configured to interlock with a corresponding interlocking portion on another weight. In operation, when the screw is rotated, the primary weight will slide within the passage. The screw may be rotated manually or by a motor, that may be controlled from within the vehicle or remotely.

The primary weight(s) may be assembled from a first weight segment and a second weight segment, typically a substantially identically shaped weight segment, each of the segments having a channel that forms the bore when the two segments are assembled to form the primary weight. The weight distribution system may include one or more additional weights, each additional weight typically having an interlocking portion suitably configured to interlock with an interlocking portion of an adjacent weight. Each additional weight also may comprise two segments. In one use, the weight tray is attached to, or incorporated within an automobile frame. In this embodiment, the center of gravity of the automobile can be lowered by the insertion of high density first weight segments into a lower (toward the road surface) side of the passage in the weight tray. The second, lower density weight segment, that when combined with the high-density weight segment forms a weight, is inserted in an upper side of the passage, opposite the road surface. An automobile frame, modified with the above-described weight tray, is also provided, as is a method for retrofitting automobile frames with the above-described weight tray.

BRIEF DESCRIPTION OF THE DRAWINGS

FIG. 3 is a cut-away side elevational view of a second embodiment of the weight distribution system described herein.

FIG. 4A is an isometric view of a weight segment of a primary weight according to one embodiment disclosed herein.

FIG. 4B is an isometric view of a first weight segment combined with a second weight segment to form an assembled primary weight.

FIG. 5A is an isometric view of a weight segment of an additional weight according to one embodiment disclosed herein.

FIG. 5B is an isometric view of a first weight segment and a second weight segment assembled to form an assembled additional weight interlocked with further assembled additional weights.

FIG. 6 is a cut-away side elevational view of a portion of a third embodiment of the weight tray described herein.

DETAILED DESCRIPTION

Figure 1:
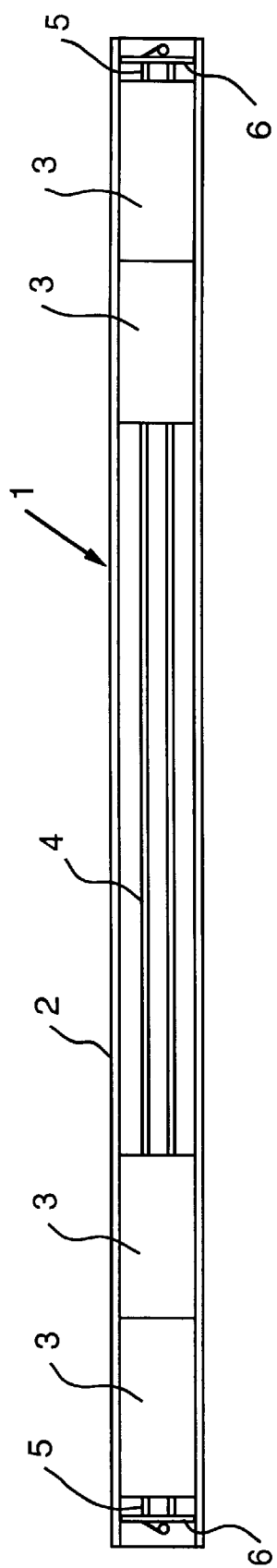
FIG. 1 is a cut-away side elevational view of a prior art weight distribution system.
Figure 2:
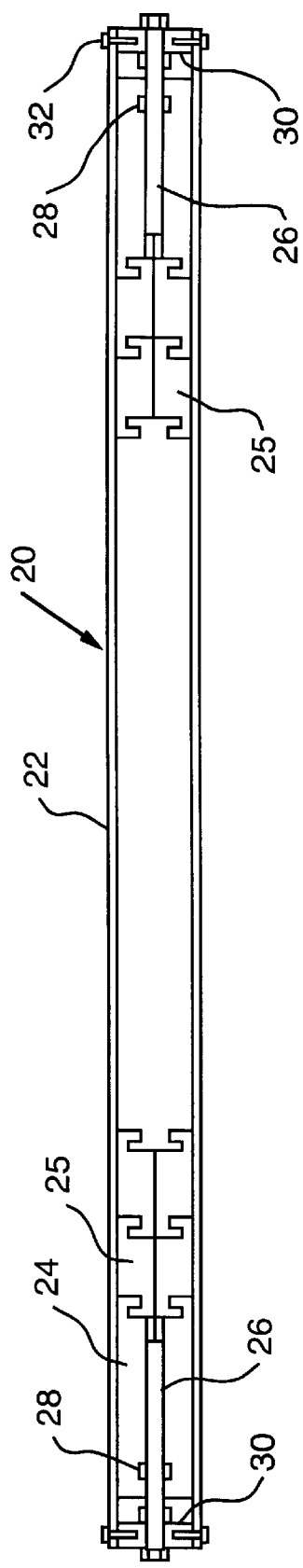
FIG. 2 is a cut-away side elevational view of one embodiment of the weight distribution system described herein.
Figure 7:
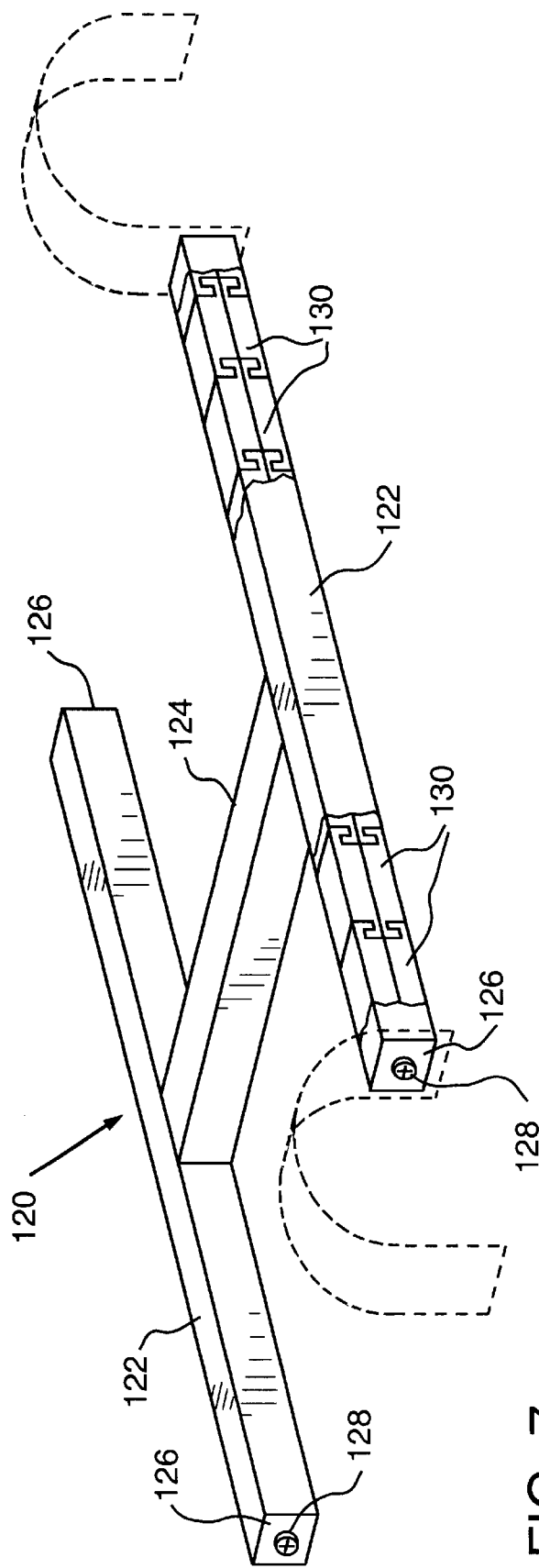
FIG. 7 is a partially cut-away isometric view of a part of an automobile frame incorporating one embodiment of the weight tray described herein.
Figure 8:
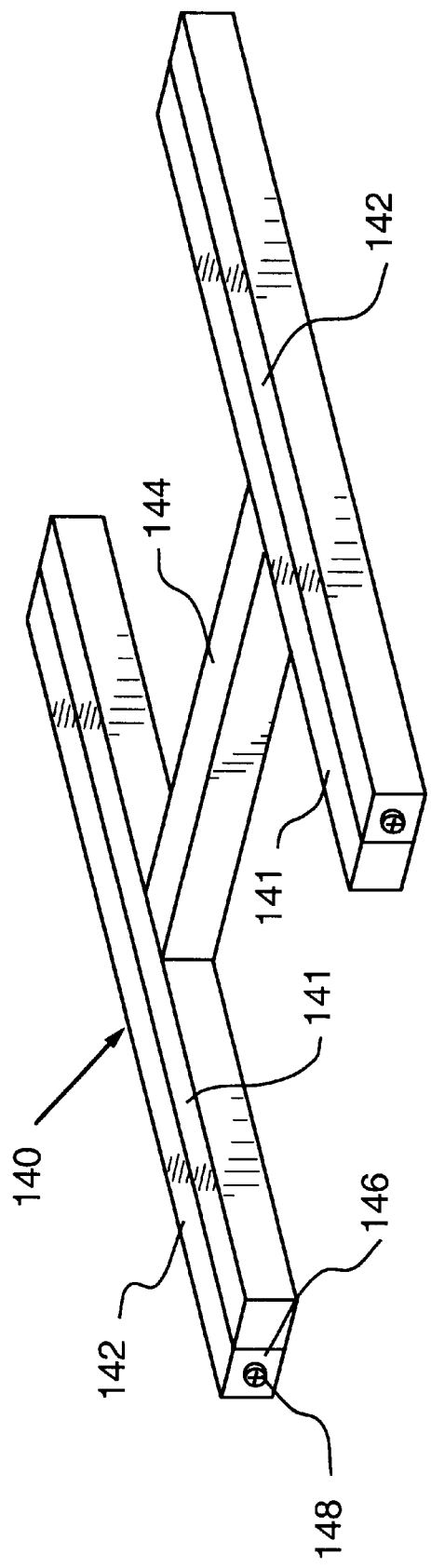
FIG. 8 is an isometric view of a part of an automobile frame having attached thereto a second embodiment of the weight tray described herein.

The present invention is described in reference to the embodiments shown in the Figures. FIG. 2 shows one embodiment of a weight tray that embodies the weight distribution system described herein. The weight distribution system shown in FIGS. 2–7 is a weight distribution system for automobiles. However, the weight distribution system also may be used in other terrestrial aquatic or airborne vehicles. The weight tray shown in FIG. 2 is in the form of an automobile frame member 20 that is attached to or incorporated within an automobile frame, as is shown in FIGS. 7 and 8, discussed below. The frame member 20 comprises a weight tray 22 with primary weight segments 24 and additional weight segments 25, slidably disposed therein. By "slidably disposed" it is meant that the primary weight segments 24 can be moved within the weight tray 22 by mechanical force. The weight tray 22 shown in FIGS. 2–7 is a hollow rectangular beam, i.e., having a rectangular cross section. However, the weight tray 22 may have any cross-sectional shape including, without limitation, square, rectangular, circular, oval, and triangular. Similarly, The weights disposed therein may have a variety of cross-sectional profiles.

A threaded bolt 26 is inserted in an end of the weight tray 22 and passes through a bore between a pair of weight segments 24 that comprise a primary weight located adjacent to the end of the weight tray 22. Each primary weight segment 24 of the primary weight has a longitudinally extending channel that forms a bore into which the bolt 26 extends when those primary weight segments 24 are assembled to form the primary weight. A locking mechanism (not shown) may be provided to prevent bolt 26 from turning. Additional weight segments 25 form additional weights attached to the primary weights. In use, the additional weight segments are optional.

In FIG. 2, each pair of interlocking weight segments 24 has a nut 28 disposed in the bore between the primary weight segments 24. The nut 28 is suitably configured to operatively engage the threads of bolt 26 and is substantially immobilized within the bore so that it cannot move longitudinally within the bore and cannot rotate when the bolt 26 is rotated. By "operative engagement" it is meant that the threads of the bolt 26 engage the threads of the nut 28 so that when the bolt 26 is rotated, the nut 28 moves along the length of the bolt 26. A lubricant, such as oil or grease, may be applied to the bolt 26 and/or surfaces of the passage or weight segments 24 and 25, to facilitate rotation of the bolt 26 and sliding of the weight segments 24 and 25. The nut 28 may be located at any point within the bore. At the end of the weight tray 22 is a retainer 30 that defines a hole through which the bolt 26 passes.

Retainer 30 allows the bolt 26 to rotate, but retains the bolt so as to prevent longitudinal motion of the bolt 26. This may be achieved by any method known in the art. For instance and without limitation a cotter pin, or like device, that would pass through a hole drilled in the bolt 26 inward in relationship to the retainer 30 would be suitable to retain the bolt 26 in place relative to the retainer 30, while permitting rotation of the bolt 26 (not shown). The retainer 30 is removably affixed to the end of the weight tray 22 by retainer screws 32 that pass through holes in the end of the weight tray 22 to hold the retainer 30 in place. In FIG. 2, the weight tray 22 includes two sets of primary weights at opposite ends of the weight tray 22, with two additional weights interlocked with each of the primary weights at opposite ends of the weight tray 22. The weight tray 22 is suitably configured so that when one of the bolts 26 is rotated, the weights slide longitudinally within the weight tray 22.

FIG. 3 shows a frame member 40 including a weight tray 42, threaded bolts 46, retainers 50 and retaining screws 52, substantially as is shown in FIG. 2. However, the frame member 40 includes weights 44 and 45 slidably disposed within the weight tray 42. Two sizes of weights, 44 and 45 respectively, are shown. Each weight has a threaded portion 48 that is suitably configured to operatively engage the bolt 46. Threaded portions 48 represent portions of the bore that are threaded, but can represent nuts that are formed within weights 44 and 45 when they are manufactured. The threaded portions 48 may be located at any point within the bore of the weights, 44 and 45, and may extend for any length down the bore. The bore may be completely threaded. In this embodiment, as compared to the embodiment shown in FIG. 2, the weights 44 and 45 do not comprise weight segments 24 and 25, and do not interlock, thus requiring that each weight 44 and 45 include a threaded portion 48. In this embodiment, the bolt 46 extends through bores in each weight. Adjustment of the position of the weights 44 and 45 in the weight tray is achieved in the same manner as in FIG. 2, by turning the bolt 46.

In the embodiments shown in FIGS. 2 and 3, the distribution of the weights in the weight trays is accomplished by rotating the bolt until a desired weight distribution is achieved. In reference to FIGS. 2 and 3, additional weights 45 and weight segments 25 can be added or removed by removing the retainer screws 32 and 52 and sliding out of the weight tray 22 and 42, the retainer 30 and 50, the bolt 26 and 46, and the weights 44 and 45 or weight segments 24 and 25, including the nut 28 or respective threaded portions 48, as a single assembly. In the embodiment of FIG. 2, the weight segments 25 are removed or added by interlocking desired weight segments 24 and 25 together. In the embodiment shown in FIG. 3, the additional weights 45 are added or removed from the bolt 46 by rotating either the bolt 46 or the additional weights 45. When the desired primary weight segments 24 or primary weights 44, and optionally additional weight segments 25 and additional weights 45, are assembled on the bolt 26 or 46, the assembly is slid into the weight tray 22 or 42 and the retainer screws 32 or 52 are tightened to fix the retainer 30 or 50 into place at the end of the weight tray 22 or 42.

FIG. 4A shows a weight segment 60 that is the same as the primary weight segment 24 shown in FIG. 2. In FIG. 4A, the segment defines a channel 61 that forms a bore through which a bolt passes when the weight segment 60 is assembled with a second weight segment 60, as shown in FIG. 4B. The weight segment 60 shown in FIG. 4A also defines a notch 62 in which a nut is inserted, as shown in FIG. 2. The notch 62 may be disposed at any point along the channel 61 and can be of any size and shape, depending upon the size and shape of the nut to be retained. The weight segment 60 includes a protuberance 64 that includes an extension portion 66 and a tab portion 68 extending perpendicularly from the extension portion 66. The protuberance 64 is an interlocking portion that co-acts with a corresponding portion of a weight segment, such as the weight segments 25 of FIG. 2.

FIG. 5A shows an additional weight segment 80 that is the same as the weight segment 25 shown in FIG. 2. The weight segment 80 includes two protuberances 84 that include extension portions 86 and tab portions 88 extending perpendicularly from the extension portions 86. FIG. 5B shows how the weight segments 80 and dense weight segments 81 having the same shape, but greater mass, can be interlocked to attach any number of additional weights to the primary weight(s). In FIG. 5B, weight segments 80 are composed of a less dense material than dense weight segments 81. When the weight tray 22 shown in FIG. 2 is attached to or incorporated within an automobile frame, and the dense weight segments 81 are placed in weight tray 22 closer to the surface on which the automobile rides, the center of gravity of the automobile is lowered, thereby improving the handling of the vehicle. Dense weight segments 81 can be manufactured from any material, so long as dense weight segment 81 has a greater overall density that weight segment 80. Suitable dense materials are metals such as, tungsten and alloys thereof, such as Densalloy, commercially available from Tungsten Products an Allegheny Technologies company, and depleted uranium. The less dense weight segments 80 may be manufactured from a lighter material, such as aluminum, or alloys thereof, or non-metallic compounds such as ceramic or polymeric materials.

Although manufacture of weight segments having two protuberances are preferred, the weight segments may only have one protuberance. However, any segment that has only one protuberance cannot attach to adjacent weight segments. It is possible to combine as an assembled weight an interlocking weight segment with a weight segment having one or no protuberance (not shown) and still maintain attachment of the adjacent segments via the interlocking weight segment. Nevertheless, combination of additional weight segments each having two protuberances is preferred.

FIG. 6 shows an alternate embodiment of the frame member 20 of FIG. 2. In FIG. 6, the frame member 100, weight tray 102, weight segments 104, nut 110, bolt 112, retainer 114 and retainer screws 116 are the same as in FIG. 2. Additional weights 106 and 108 are provided, but are not assembled from weight segments, as are the additional weights in FIG. 2. Also, with respect to the interlocking members shown in FIG. 2, the geometry of these members are reversed in the embodiment shown in FIG. 6. From this illustration it is important to note that the method for attaching the adjacent weights and/or weight segments can vary greatly, even with the same weight tray. A few simple, but very effective, interlocking, or joinery methods chosen from a myriad of known joining methods are illustrated herein.

FIG. 6 also shows a motor 118, schematically. The motor 118 is linked to the threaded bolt, for turning the bolt. The motor 118 can be controlled from within the vehicle or remotely, either manually or automatically. A computerized device may be linked to sensors on the vehicle in which the frame member 100 is installed, that monitors vehicle performance and/or attitude and adjusts the weights, if needed, to enhance the performance of the vehicle. The motor 118 is any non-manual device that can cause the bolt 112 to turn. The motor 118 may be linked to the bolt 112 by any mechanical linkage, for example, and without limitation, through gears, rack and pinion devices and/or belts. Although prohibited by the current rules of certain racing authorities, such as NASCAR, automating or motorizing the weight distribution system may have distinct benefits. The weight distribution system also may be used in commercial automobiles to modify vehicle attitude and handling automatically, or at the control of the driver, while the car is being driven.

Even though a screw mechanism is shown as the mechanical means for fine-tuning the weight balance on the described vehicle, other linear actuator devices, such as hydraulic and pneumatic devices, are reasonable substitutions for the depicted screw mechanism.

FIG. 7 shows an automobile frame portion 120 having integrated weight trays 122. The weight trays 122 are joined by one or more cross-elements 124 to form a basic automobile frame structure. It should be noted that for clarity the bulk of the typical automobile frame elements are omitted from the drawings of FIGS. 7 and 8. Additional cross-ties and frame elements typically are attached at various points to the frame portions 120 and 140 to depicted in FIGS. 7 and 8 form a complete automobile frame. FIG. 7 shows a retainer 126, a bolt 128 and weight segments 130, as shown in the previous Figures. The weight trays 122 typically extend along a line between the front and rear wheels on both sides of an automobile in which they are installed. The ends of each of the weight trays 122 typically are immediately adjacent to or form a part of the respective front and back wheel wells of the automobile in which they are installed, represented schematically in phantom in FIG. 7 for one weight tray 122. It should be noted that the front-to-back orientation of the weight tray that is depicted in FIGS. 7 and 8 is one of many possible orientations. The weight tray may be configured left-to-right, or top-to-bottom, or on any other axis, depending on the desired vehicle attitude adjustment.

FIG. 8 shows an alternate automobile frame portion 140. In this embodiment, the weight trays are attached to lateral frame elements 141, which are attached to weight trays 142. The lateral frame elements 141 are joined by cross-element 144. Retainers 146 and bolts 148 are also shown. Although a frame may be manufactured in this configuration, this embodiment also is illustrative of a retrofit configuration of the weight distribution system described herein. By this method, existing frames may be modified by attaching weight trays 142 to the existing right and left lateral frame elements 141 of the vehicle.

It should be noted that while the embodiments described herein are particularly applicable to automobiles, especially high performance vehicles, certain embodiments of the described weight distribution system may find use in other land vehicles, as well as in aquatic or flying vehicles.

The above invention has been described with reference to the preferred embodiment. Obvious modifications and alterations will occur to others upon reading and understanding the preceding detailed description and the claims. It is intended that the invention be construed as including all such modifications and alterations.

I claim:

1. A weight distribution system for a vehicle, comprising:

a. a weight tray having an internal passage;

b. a screw that extends into a first end of the internal passage;

c. a retainer removably attached to the first end of the internal passage, said retainer defining a hole through which the screw is rotatably retained;

d. a primary weight slidably disposed within the passage, said primary weight having a bore into which the screw extends; and e. a screw engaging member that operably engages the threads of the screw disposed within the bore, wherein said screw engaging member engages at least a portion of the bore to retain the screw engaging member in a substantially fixed position in said weight and to inhibit rotation of the screw engaging member, such that when the screw is rotated, the primary weight will slide within the passage.

2. The weight distribution system of claim 1, wherein the primary weight further comprises an interlocking portion on a side of the primary weight away from the retainer, said interlocking portion is configured to interlock with a corresponding interlocking portion on a second weight.

3. The weight distribution system of claim 1, further comprising one or more additional weights slidably disposed within the passage, said additional weights having a bore through which the screw extends, each additional weight comprising a tapped member that engages the screw, said tapped member is disposed within the bore and engages at least a portion of the bore to retain the tapped member in a fixed position in said additional weights and to inhibit rotation of the tapped member.

4. The weight distribution system of claim 1, further comprising a motor linked with the screw and configured to turn the screw to adjust the position of the weight within the tube.

5. The weight distribution system as claimed on claim 1, wherein the primary weight comprises a first weight segment and a second weight segment that are assembled to form the primary weight, each of said segments having a channel that forms the bore when the two segments are assembled to form the primary weight.

6. The weight distribution system of claim 5, wherein the screw engaging member is a nut and the channels include a notch that is configured to engage the nut within the assembled primary weight in a substantially fixed position in the channel and to inhibit rotation of the nut within the notch.

7. The weight distribution system of claim 5, wherein the primary weight further comprises an interlocking portion on a side of the primary weight away from the retainer, said interlocking portion is configured to interlock with a corresponding interlocking portion on a second weight.

8. The weight distribution system of claim 7, further comprising one or more additional weights, each said additional weight having an interlocking portion configured to interlock with an interlocking portion of an adjacent weight.

9. The weight distribution system of claim 5, wherein at least one of said weight segments that form the primary weight comprise a protuberance, said protuberance comprises a longitudinal extension portion that extends from the weight segment and a tab portion that extends from the extension portion, said protuberance is configured to engage a protuberance on a second weight segment of a second weight that comprises a longitudinal extension portion that extends from the second weight and a tab portion that extends from the extension portion of the second weight segment.

10. The weight distribution system of claim 9, wherein the tab portions of both the primary weight and the second weight extend substantially perpendicularly from the respective extension portions.

11. The weight distribution system of claim 9, wherein both segments that comprise the primary weight include said protuberance.

12. The weight distribution system of claim 5, wherein said first weight segment has a different density than said second weight segment and said weight segments have substantially the same volume.

13. The weight distribution system of claim 5, wherein said weight tray has a lower side, that, when installed in or on an automobile frame, faces the surface on which the automobile rides and an upper side, opposite the lower side, wherein said first weight segment has a higher density than said second weight segment and said weight segments have substantially the same volume, and wherein said first segment is disposed substantially in the lower side of the passage.

14. The weight distribution system of claim 13, wherein the first weight segment is one of depleted uranium, tungsten and a tungsten alloy and the second weight segment is aluminum or an aluminum alloy.

15. An automobile frame, comprising:
   a. automobile frame structural elements configured to form an automobile frame;
   b. a weight tray having an internal passage, attached to the frame;
   c. a screw that extends into a first end of the internal passage;
   d. a retainer removably attached to the first end of the internal passage, said retainer defining a hole through which the screw is rotatably retained;
   e. a primary weight slidably disposed within the passage, said primary weight having a bore into which the screw extends; and
   f. a screw engaging member that operably engages the threads of the screw disposed within the bore, wherein said screw engaging member engages at least a portion of the bore to retain the screw engaging member in a substantially fixed position in said weight and to inhibit rotation of the screw engaging member, such that when the screw is rotated, the primary weight will slide within the passage.

16. The automobile frame of claim 15, wherein the weight tray is elongated and is attached to the frame to extend substantially on a line that extends between a front and a rear wheel well on a side of the automobile, or on a line parallel thereto.

17. A method for distributing weight in a vehicle, comprising the steps of:
   a. affixing to a vehicle a weight distribution system comprising:
      i. a weight tray having an internal passage;
      ii. a screw that extends into a first end of the internal passage;
      iii. a retainer removably attached to the first end of the internal passage, said retainer defining a hole through which the screw is rotatably retained;
      iv. a primary weight slidably disposed within the passage, said primary weight having a bore into which the screw extends; and
      v. a screw engaging member that operably engages the threads of the screw disposed within the bore, wherein said screw engaging member engages at least a portion of the bore to retain the screw engaging member in a substantially fixed position in said weight and to inhibit rotation of the screw engaging member, such that when the screw is rotated, the primary weight will slide within the passage; and
   b. turning the screw to slide the weights within the passage.

18. A method for retrofitting an automobile, comprising the step of attaching to a frame of an automobile a weight distribution system, comprising:
   a. a weight tray having an internal passage;
   b. a screw that extends into a first end of the internal passage;
   c. a retainer removably attached to the first end of the internal passage, said retainer defining a hole through which the screw is rotatably retained;
   d. a primary weight slidably disposed within the passage, said primary weight having a bore into which the screw extends; and
   e. a screw engaging member that operably engages the threads of the screw disposed within the bore, wherein said screw engaging member engages at least a portion of the bore to retain the screw engaging member in a substantially fixed position in said weight and to inhibit rotation of the screw engaging member, such that when the screw is rotated, the primary weight will slide within the passage.

19. The method of claim 18, wherein the weight tray is attached to the frame to extend substantially on a line that extends between a front and a rear wheel well on a side of the automobile, or on a line parallel thereto.

* * * * *